Aug. 10, 1954 J. N. STRAUSS 2,685,888
SHOCK ABSORBER FOOT VALVE
Filed Feb. 14, 1949 2 Sheets-Sheet 1
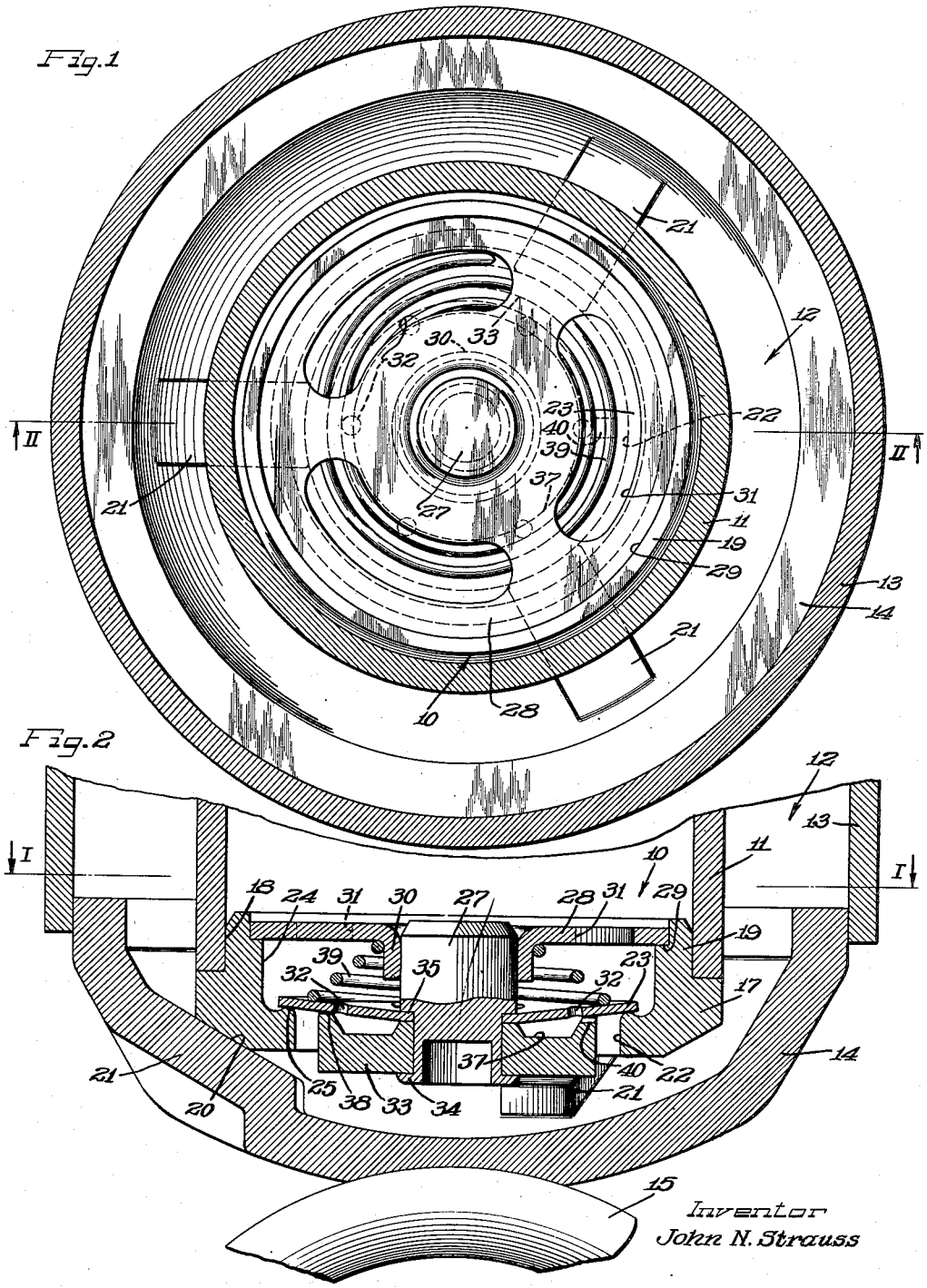

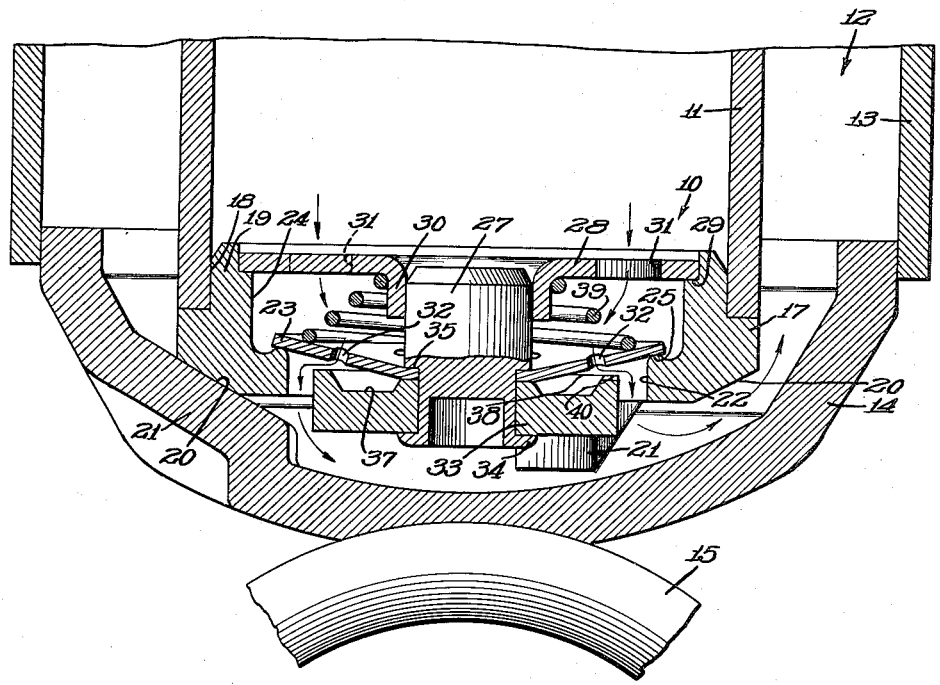
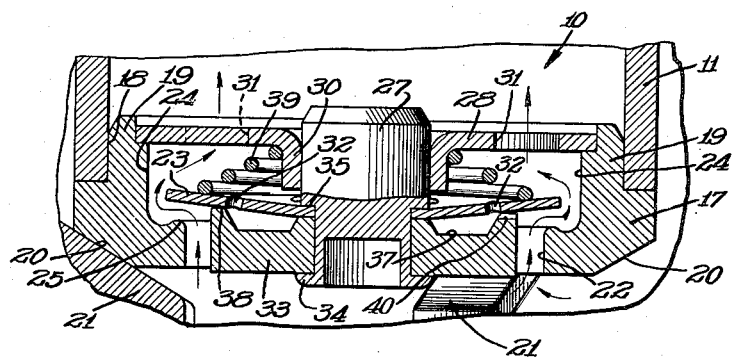

Patented Aug. 10, 1954

2,685,888

UNITED STATES PATENT OFFICE 2,685,888

SHOCK ABSORBER FOOT VALVE

John N. Strauss, Williamsville, N. Y., assignor to Houdaille-Hershey Corporation, Detroit, Mich., a corporation of Michigan Application February 14, 1949, Serial No. 76,395

5 Claims. (Cl. 137—493.6)

1

The present invention relates to improvements in foot valve constructions especially adapted for use in direct acting shock absorbers of the kind which are used as shock absorbers and snubbers between the sprung and unsprung portions of various types of vehicles such as automobiles or the like.

In direct acting or telescopic shock absorbers in which hydraulic fluid is displaced in operation between a cylinder chamber and a reservoir, a foot valve is customarily employed for controlling such fluid displacement.

Due to the many variables in operation and of temperature which must be met by a shock absorber of this type in service, many problems have been encountered in the construction of the foot valves in endeavoring to attain satisfactory performance. Among the various problems which must be satisfactorily overcome, and which prior constructions have often not met as effectively as might be desired in one or more respects, may be mentioned avoidance of noise in operation, uniform performance throughout operating temperature ranges, adaptability to various compression requirements for specified installations, economy in manufacture, simplicity in assembly, and uniformity of results in mass produced units.

An important object of the present invention is to provide a foot valve construction for use in direct acting shock absorbers and which will satisfactorily meet the several problems and requirements as enumerated above, as well as others.

Another object of the invention is to provide a foot valve construction which is capable of mass production and in which the individual units or foot valve assemblies will perform with exceptionally close consistency of resulting compression forces.

A further object of the invention is to provide a foot valve construction which is free from high frequency vibrations in operation and is thus unusually quiet in operation.

Still another object of the invention is to produce a foot valve construction characterized by greatly increased resistance or work capacity over prior constructions, and in which by simple calculated modification as to certain specific dimensions a wide range of operational requirements as to compression resistance can be attained.

Yet another object of the invention is to provide an improved foot valve construction in which the increase in resistance at sub-normal temperatures is materially reduced in the presence of the hydraulic fluids customarily employed in direct acting shock absorbers.

A still further object of the invention is to provide a foot valve assembly which is economical in production and susceptible of mass production methods of assembly and is rugged and durable in service.

2

Other objects, features and advantages of the present invention will be readily apparent from the following detailed description of a preferred embodiment thereof taken in conjunction with the accompanying drawings, in which:

Figure 1 is an enlarged horizontal sectional view taken on the line I—I of Figure 2 through the lower portion of a direct acting shock absorber and showing a foot valve embodying the features of the present invention assembled therein;

Figure 2 is a vertical sectional detail view taken on substantially the line II—II of Figure 1;

Figure 3 is a sectional detail view similar to Figure 2 but showing the valve mechanism in the compression blow-off relationship; and Figure 4 is a sectional detail view similar to Figure 2 but showing the valve mechanism in the rebound blow-off or replenishment relationship.

A foot valve 10 embodying the features of the present invention is adapted to be utilized in a direct acting or telescopic shock absorber including a cylinder 11 within which is operable a piston attached to one part of a relatively movable assembly or apparatus, such as the sprung portion of an automobile or other vehicle. In the course of reciprocable operative movements of the piston, hydraulic fluid is displaced between the interior of the cylinder 11 and a reservoir 12 defined about the cylinder 11 by a larger diameter concentric cylindrical casing 13 which is fixedly mounted with respect to the cylinder 11. The casing 13 is permanently and hermetically connected to or forms part of an end cap or closure member 14 having means such as an attachment eye 15 by which the lower end of the shock absorber is attached to the remaining portion of the relatively movable apparatus or members, such as the unsprung portion of a vehicle.

As a basic component of the foot valve assembly 10 a cage structure or member 17 is provided which is preferably of cylindrical form having a maximum diameter equal to that of the shock absorber cylinder 11 and assembled with the lower end of the cylinder which is fixedly seated as by press fit within an upper outer corner rabbet groove 18 in an upper annular portion 19 on the cage 17 fitting within the cylinder 11. The lower outer corner of the cage 17 is preferably tapered generally frusto-conically as at 20 to seat in centered relation upon similarly tapered or diagonally faced upwardly projecting centering and spacer projections or embossments 21. Three of the embossments 21 have been shown and these function to maintain the valve cage 17 spaced from the major opposing area of the end closure cap 14 so that relatively free passage between the underside of the foot valve assembly 10 and the reservoir 12 is afforded.

Fluid displacement on compression and rebound strokes of the piston is accommodated through an axial displacement passage 22 through the valve cage member 17. Control of such fluid displacement is effected by means of a disk valve member 23 operative to substantially check compression displacement of the hydraulic fluid from the compression chamber in the cylinder 11 into the reservoir 12 and to permit relatively rapid and only lightly restrained replenishment displacement of the hydraulic fluid from the reservoir 12 into the chamber of the cylinder 11 during rebound stroke of the piston.

Functional cooperation of the valve member 23 with the valve cage member 17 is effected by the provision of an enlarged diameter upper portion 24 of the fluid displacement passage 22 and which at the upper edge of the normal diameter lower portion is formed with an upwardly projecting annular valve seat 25, preferably of annular cross-section and smoothly and uniformly finished upon which the valve disk member 23 seats in fluid sealing relation, the diameter of the valve disk being larger than the normal diameter of the passage 22 but smaller than the enlarged diameter portion 24.

Means are provided for retaining the disk valve member 23 in a vertical or axial path of movement relative to the valve seat 25 and against lateral displacement or canting relative to the valve seat. Such means herein comprises an axial stem 27 assembled with the valve disk 23 and slidably guided by a retainer and guide plate member 28. The diameter of the plate 28 is slightly larger than the diameter of the enlarged flow passage portion 24 and the margin of the plate is secured as by press-fit within a rabbet groove 29 provided therefor at the upper margin of the enlarged diameter passage portion 24. A downturned annular guide flange 30 on the plate member 28 defines an axial bearing within which the upstanding guide stem 27 is slidably guided for vertical reciprocal movement. The lower edge of the flange 30 provides an upper limit abutment for the valve disk 23 so that the valve disk is limited to a range of movement between the valve seat 25 and the lower edge or extremity of the bearing flange 30. Substantially free through passage of displaced hydraulic fluid through the plate 28 is accommodated by a series of relatively large flow area apertures 31 through the plate and which, as best seen in Figure 1, may be of generally kidney shape and disposed on a common circle in equally spaced relation and leaving a substantially spider-like central portion of the plate rigidly disposed for its valve stem or guide pin guiding relation.

For compression blow-off displacement of hydraulic fluid, the construction and arrangement of the valve disk 23 is such that upon development of predetermined compression force passageway is opened through and past the disk valve. To this end, the disk valve 23 is formed from flexible material such as a tempered resilient steel of suitable quality and is secured to the guide stem or pin 27 in such manner as to be resiliently yieldable upon development of the predetermined compression stroke fluid force exerted through a series of blow-off apertures 32 through the valve disk and directed against a compression blow-off control auxiliary valve member 33. Herein the blow-off valve member 33 is in the form of a fairly heavy disk which is centrally apertured coaxially and in registration with the resilient main valve disk 23 and is secured about a lower reduced diameter stem end portion of the guide pin member 27, the latter being counterbored at its lower end to provide a thin annular end wall portion which is terminally upset to provide a clamping flange 34 by which the valve members 23 and 33 are rigidly clamped against an annular shoulder 35 at the upper end of the reduced diameter portion of the guide stem.

On the upper face of the rigid compression blow-off control valve member 33 which opposes the resilient main disk valve 23, an intermediate annular groove 37 is provided bounded at its outer perimeter by a valve rim 38 upwardly offset from the inner margin of the upper face of the member 33 so that in the assembly the valve disk 23 is maintained in a normally stressed or loaded condition by uniform upward deflection of the principal body portion thereof radially outwardly from the clamped inner margin of the resilient disk. This arrangement assures that the valve rim 38 will normally be engaged firmly in fluid sealing relation by the resilient valve disk 23 so that normally fluid passing through the passage apertures 32 in the valve disk 23 disposed radially inwardly from the line of engagement by the lip 38 will be blocked against escape from the clearance groove 37. However, upon the exertion of predetermined compression force upon the valve member 33 within the groove 37 resilient flexing of the disk valve 23 permits downward movement of the valve member 33 while the outer periphery of the valve 23 remains seated upon the valve seat 25, substantially as shown in Fig. 3 for compression blow-off. Promptly upon relief of the compression force the valve members resume the compression displacement checking relationship.

It will be apparent that by proper selection of the resilient or tension characteristics of the resilient disk valve 23, proper compression blow-off resistance or weight can be attained in the foot valve assembly without any alteration in the remaining components of the assembly and any particular service installation requirements can be successfuly met.

For replenishment flow of hydraulic fluid from the reservoir 12 to the chamber within the cylinder 11, the disk valve 23 is lifted from its seat substantially as shown in Figure 4. Such replenishment lifting of the valve assembly is resisted merely by a relatively weak spring 39 which may be in the form of a spiral coil spring having its small end seated against the underside of the retainer disk 28 about the neck defined by the bearing flange 30, while the larger lower end of the spring bears against the upper face of the valve disk 23 adjacent to the outer margin of the latter. This assures that following replenishment the valve 23 will snap back to its compression checking position.

Normal relatively slight compression and replenishment flow of hydraulic fluid, often referred to as orifice displacement flow, is accommodated by orifice means in the form of one or more orifice grooves 40 coined or milled radially in the valve flange or lip 38.

I claim as my invention:

1. In combination in a direct acting shock absorber foot valve construction, a valve cage member, said member having an axial fluid displacement passage therethrough, the upper portion of said passage being of larger diameter than the lower portion, the edge defining the upper end of the smaller diameter portion of the passage having an annular valve seat thereabout, a disk valve member engaging upon said seat and providing a check against compression displacement flow of fluid through said passageway, a guide stem projecting upwardly from said valve member, and means carried by the upper end portion of said valve cage member guiding said stem for reciprocal vertical movements of said valve member relative to said valve seat, said valve member being flexible and having a series of compression blow-off apertures therethrough and said stem carrying an auxiliary blow-off control valve member below said flexible valve member and normally coacting with the flexible valve member to check fluid displacement through said apertures but being responsive to predetermined fluid force exerted through said apertures and against the auxiliary valve member to effect downward flexure of the flexible valve member and opening of a fluid blow-off passage thereby.

2. In combination in a foot valve construction for a direct acting shock absorber and constructed and arranged for control of hydraulic fluid for both compression stroke and replenishment flow of fluid therethrough between the cylinder and the reservoir of the shock absorber, a valve cage member having a flow passage therethrough with an upwardly facing annular valve seat in the lower portion of the passage, a flexible disk valve member engaging said seat for controlling compression stroke displacement of fluid through said passage, said valve disk having a plurality of fluid displacement apertures therethrough spaced substantially inwardly from the margin of the disk member engaging the valve seat, a stem projecting upwardly from said disk member and also having a portion projecting downwardly from the disk member, means for guiding the stem carried by the upper portion of the cage member, a rigid valve disk fixedly assembled upon the downwardly projecting portion of the stem and bearing against the underside of the flexible valve disk member intermediate the valve seat and said displacement apertures, and a coiled compression spring engaging between said guide means and said flexible valve disk member normally urging the flexible valve disk member against said seat for relatively light resistance to replenishment fluid flow through said passage to unseat the flexible valve disk member and move upwardly through the passage past the valve disks and said valve seat, said rigid valve disk resisting fluid flow through said apertures on the compression stroke but being movable into separated fluid passage relationship to the flexible valve disk member by flexure of the flexible valve disk member upon the development of substantial compression stroke fluid pressure thereagainst.

3. A foot valve construction as defined in claim 2 wherein the rigid valve disk has a metering orifice by-passing the same for limited flow of fluid in either direction under conditions of pressure less than required to flex said flexible valve disk on compression fluid pressure or unseat the same responsive to replenishment fluid flow pressure.

4. In combination in a foot valve construction for a direct acting shock absorber and constructed and arranged for control of hydraulic fluid for both compression stroke and replenishment flow of fluid therethrough between the cylinder and the reservoir of the shock absorber, a valve cage member having a flow passage therethrough with an upwardly facing annular valve seat in the lower portion of the passage, a flexible disk valve member engaging said seat for controlling compression stroke displacement of fluid through said passage, said valve disk having a plurality of fluid displacement apertures therethrough spaced substantially inwardly from the margin of the disk member engaging the valve seat, a stem projecting upwardly from said disk member, means carried by the upper portion of the cage member for guiding the stem, a rigid valve disk of smaller diameter than said flexible disk valve member fixedly assembled concentrically with the central portion of said flexible valve disk member and having an annular valve rim bearing against the underside of the flexible valve disk member intermediate the valve seat and said displacement apertures, and means normally biasing said flexible valve disk member against said seat under light resistance to replenishment fluid flow pressure upwardly thereagainst to unseat the flexible valve disk member to move upwardly as guided by cooperation of said stem with said guiding means to enable upward replenishment flow of fluid through said passage past the valve disk and said valve seat, said guiding means also affording passage for flow of fluid thereby, said flexible valve disk member blocking compression stroke fluid flow through said passage past said valve seat but being flexible responsive to predetermined compression stroke fluid pressure thereagainst to move downwardly at the center and thereby move said rigid valve disk rim into separated relation to the flexible valve disk member to open a gap for compression stroke fluid flow through said apertures and past said rigid valve disk.

5. In combination in a foot valve construction for direct acting shock absorbers, a valve cage member having a flow passage therethrough with a generally upwardly facing annular valve seat in the lower portion of the passage, a flexible disc valve seated on said seat and having a passage therethrough normally closed by a rigid disc member therebeneath, said flexible and rigid valve members being secured to a valve stem projecting upwardly through said passage, a perforated guide plate secured marginally to the upper portion of said valve cage member and having a central aperture defined by a downturned annular bearing flange of substantial length within which said stem is guided slidably, and a coiled compression spring having an upper coil encircling said flange at juncture of the flange with the plate, the lowermost coil of the spring being disposed in biasing engagement with said flexible valve disc normally to retain it upon said seat.

References Cited in the file of this patent

UNITED STATES PATENTS

| Number | Name | Date |
|---|---|---|
| 741,828 | Presnell | Oct. 20, 1903 |
| 1,244,382 | Slinack | Oct. 23, 1917 |
| 1,991,043 | Bates | Feb. 12, 1935 |
| 2,060,590 | Padgett | Nov. 10, 1936 |
| 2,087,451 | Rossman | July 20, 1937 |
| 2,110,691 | Aikman | Mar. 8, 1938 |
| 2,112,641 | Wheaton | Mar. 29, 1938 |
| 2,356,360 | Smolensky | Aug. 22, 1944 |
| 2,431,966 | Rossman | Dec. 2, 1947 |

FOREIGN PATENTS

| Number | Country | Date |
|---|---|---|
| 350,728 | Germany | of 1922 |
| 861,023 | France | of 1941 |